United States Patent
Dannenberg (10) Patent No.: US 6,589,657 B2
(45) Date of Patent: Jul. 8, 2003

(54) ANTI-REFLECTION COATINGS AND ASSOCIATED METHODS

(75) Inventor: Rand David Dannenberg, Benicia, CA (US)

(73) Assignee: Von Ardenne Anlagentechnik GmbH, Dresden (DE)

(*) Notice: Subject to any disclaimer, the term of this patent is extended or adjusted under 35 U.S.C. 154(b) by 0 days.

(21) Appl. No.: 09/945,262

(22) Filed: Aug. 31, 2001

(65) Prior Publication Data
US 2003/0064255 A1 Apr. 3, 2003

(51) Int. Cl.[7] ............................................... G02B 1/10
(52) U.S. Cl. ..................... 428/432; 428/433; 428/697; 428/701; 428/702
(58) Field of Search ................. 428/432, 433, 428/697, 701, 702

(56) References Cited

U.S. PATENT DOCUMENTS

| | | | |
|---|---|---|---|
| 2,281,474 A | 4/1942 | Cartwright et al. | |
| 2,478,385 A | 8/1949 | Gaiser | |
| 2,782,676 A | 2/1957 | Osterberg | |
| 3,185,020 A | 5/1965 | Thelen | |
| 3,235,397 A | 2/1966 | Millendorfer | |
| 3,432,225 A | 3/1969 | Rock | |
| 3,463,574 A | 8/1969 | Bastien et al. | |
| 3,604,784 A | 9/1971 | Louderback et al. | |
| 3,712,711 A | * 1/1973 | Adachi ...................... 350/164 |
| 3,761,160 A | 9/1973 | Apfel et al. | |
| 3,781,090 A | 12/1973 | Sumita | |
| 4,046,659 A | 9/1977 | Cormia et al. | |
| 4,128,303 A | 12/1978 | Onoki et al. | |
| 4,166,018 A | 8/1979 | Chapin | |
| 4,313,647 A | 2/1982 | Takazawa | |
| 4,356,073 A | 10/1982 | McKelvey | |
| 4,422,916 A | 12/1983 | McKelvey | |
| 4,568,578 A | 2/1986 | Arfsten et al. | |
| 4,921,760 A | 5/1990 | Tani et al. | |
| 4,990,234 A | 2/1991 | Szczyrbowski et al. | |
| 5,047,131 A | 9/1991 | Wolfe et al. | |
| 5,091,244 A | 2/1992 | Biornard | |
| 5,105,310 A | 4/1992 | Dickey | |
| 5,194,990 A | 3/1993 | Boulos et al. | |
| 5,262,633 A | 11/1993 | Kasai et al. | |

(List continued on next page.)

FOREIGN PATENT DOCUMENTS

| | | | |
|---|---|---|---|
| EP | 0 263 541 A2 | 4/1988 | |
| EP | 0 520 720 B1 | 12/1992 | |
| JP | 7081977 A | 3/1995 | |
| JP | 07-081977 | * 3/1995 | ........... C03C/17/34 |
| JP | 10-300902 | 11/1998 | |
| WO | WO 94/19709 | 9/1994 | |

OTHER PUBLICATIONS

Strong, John; "On a Method of Decreasing the Reflection from Nonmetallic Substances"; *J.Opt.Soc.Am.*; vol. 26; Jan., 1936; pp. 73–74.

(List continued on next page.)

*Primary Examiner*—Deborah Jones
*Assistant Examiner*—Vivek Koppikar
(74) *Attorney, Agent, or Firm*—Parsons Hsue & de Runtz LLP (57) ABSTRACT

An optical coating and a method of coating a substrate are provided. A first layer is deposited adjacent to a substrate. The first layer has an optical thickness of about 0.27 $\lambda_0$ to about 0.31 $\lambda_0$, where $\lambda_0$ is a reference wavelength corresponding to a spectral region bound by or in the visible spectrum. A second layer having an optical thickness of about 0.1 $\lambda_0$ to about 0.125 $\lambda_0$ and a refractive index from about 2.2 to about 2.6 is deposited. A third layer having a refractive index from about 1.46 to about 1.52 is deposited. The optical coating provides broadband anti-reflection performance, and the thin second layer facilitates high throughput production of the optical coating.

26 Claims, 6 Drawing Sheets

U.S. PATENT DOCUMENTS

| | | | |
|---|---|---|---|
| 5,270,858 A | | 12/1993 | Dickey |
| 5,318,830 A | | 6/1994 | Takamatsu et al. |
| 5,362,552 A | | 11/1994 | Austin |
| 5,372,874 A | | 12/1994 | Dickey et al. |
| 5,407,733 A | | 4/1995 | Bjornard et al. |
| 5,450,238 A | | 9/1995 | Bjornard et al. |
| 5,460,888 A | | 10/1995 | Hashimoto et al. |
| 5,520,996 A | * | 5/1996 | Balian et al. ............... 428/216 |
| 5,579,162 A | | 11/1996 | Bjornard et al. |
| 5,667,880 A | | 9/1997 | Okaniwa |
| 5,891,556 A | | 4/1999 | Anderson et al. |
| 6,074,730 A | | 6/2000 | Laird et al. |
| 6,326,079 B1 | * | 12/2001 | Philippe et al. ............. 428/325 |

OTHER PUBLICATIONS

Lockhart, Luther B., Jr., et al.; "Three–Layered Reflection Reducing Coatings"; *J.Opt.Soc.Am.*; vol. 37, No. 9; Sep., 1947; pp. 689–694.

Young, Leo; "Antireflection Coatings on Glass"; *Applied Optics*; vol. 4, No. 3; Mar. 1965; pp. 366–367.

Ishikawa, Hiro, et al.; "Two Layer Broad Band AR Coating"; *Proceedings of Tenth International Conference on Vaccum Web Coating*; Nov. 12, 1996; pp. 221–233.

Zheng, Yanfei, et al., "Two–layer wideband antireflection coatings with an absorbing layer"; *Applied Optics*; vol. 36, No. 25; Sep. 1, 1997; pp. 6335–6338.

Schroeder, H.; "Oxide Layers Deposited from Organic Solutions"; *Physics of Thin Films*; Georg Hass and Rudolf E. Thun, eds.; vol. 5; 1969; pp. 87–141 No Month.

Mouchart, Jacques; "Thin film optical coatings. 2: Three–layer antireflection coating theory"; *Applied Optics*; vol. 16; No. 10; Oct. 1977; pp. 2722–2728.

Verma, B.S., et al.; "Unconventional structures of antireflection coatings"; *Thin Solid Films*; 42 (1977) L27–L29 No Month.

Musset, A. et al.; "Multilayer Antireflection Coatings"; *Progress in Optics 8*; 1970; pp. 201–237 No Month.

Apfel, Joseph H.; "Graphics in Optical Coating Design"; *Applied Optics*; vol. 11, No. 6; Jun. 1972; pp. 1303–1312.

Baumeister, Philip, et al.; "Application of linear programming to antireflection coating design," *J.Opt.Soc.Am.*; vol. 67, Nov. 8; Aug. 1977; pp. 1039–1045.

Carniglia, C.K.; "Oxide Coatings for One Micrometer Laser Fusion Systems"; *Thin Solid Films*; 77 (1981); pp. 225–238 No Month.

Laird, R.E. et al.; "Durable Conductive Anti–Reflection Coatings for Glass and Plastic Substrates"; *Soc. Of Vaccum Coaters*, 39$^{th}$ Annual Technical Conference Proceedings; 1996; pp. 361–365 No Month.

* cited by examiner

ANTI-REFLECTION COATINGS AND ASSOCIATED METHODS

BACKGROUND OF THE INVENTION

A simple broadband anti-reflection (AR) coating consists of three layers. An AR coating reduces the reflectance of light with wavelengths within a spectral region. The first layer of the three-layer AR coating deposited on the glass substrate generally has a medium index of refraction, specifically higher than that of the substrate, and an optical thickness which is about one quarter of the reference wavelength of the spectral region. For visible light, this reference wavelength is typically in the range of about 500 nm to about 550 nm and frequently about 550 nm. The second layer has a high index of refraction, specifically higher than the first layer, and an optical thickness which is about one-half of the reference wavelength. The third layer has a low refractive index, specifically lower than the first layer and generally lower than that of the substrate, and an optical thickness which is one quarter of the reference wavelength. The three-layer design is described in Gaiser, U.S. Pat. No. 2,478,385; Thelen, U.S. Pat. No. 3,185,020; and Lockhart et al., "Three-Layered Reflection Reducing Coatings," *J.Opt. .Soc.Am.* 37, pp. 689–694 (1947). This three-layer AR coating is often referred to as the quarter-half-quarter (QHQ) design.

A disadvantage of the three-layer design is that the refractive indices of the three layers must have specific values in order to produce optimum performance. The selection and control of the refractive index of the first layer are particularly important. Deviation from specific refractive index values cannot be compensated for by varying the physical thickness of the layers.

A major improvement in the earlier AR coatings was introduced by Rock in U.S. Pat. No. 3,432,225. The Rock AR coating is made from two coating materials, one material having a high index of refraction, generally greater than two, and the other having a low index of refraction, generally lower than that of the substrate. The Rock AR coating consists of four layers. The first layer adjacent to the substrate is of the high-index material, and the second layer from the substrate is of the low-index material. The first and second layers have an effective optical thickness of about one-quarter of the reference wavelength. The third layer from the substrate is of the high-index material and has an optical thickness which is about one-half of the reference wavelength. The fourth layer from the substrate is of the low-index material and has an optical thickness which is about one-quarter of the reference wavelength. The advantage of the Rock AR coating is that materials with specific refractive index values are not required. The physical thickness of the layers can be adjusted to give a low reflectance value across the visible spectrum for a range of possible material indices.

However, economically producing an AR coating by sputtering is problematic. First, a preferred material for the high-index third layer, titanium oxide, has a slow deposition rate. The slow rate is only partially compensated for by running the sputtering tool used to deposit $TiO_2$ at a much higher power. Thus, significant time and a number of sputter cathodes must be devoted to the sputtering of the thick third layer. Second, temperature-sensitive materials, such as plastic film which cannot take temperatures over about 60° C., or cathode ray tubes (CRTs) which cannot be exposed to temperatures above approximately 150° C., can be easily overheated by the high power of the $TiO_2$ sputter sources. To avoid overheating, the $TiO_2$ targets can be run at lower power, but only at the expense of a much slower coating process or one which requires many more $TiO_2$ targets.

SUMMARY OF THE INVENTION

An optical coating and a method of coating a substrate are provided. A first layer is deposited adjacent to a substrate. The first layer has an optical thickness of about $0.27 \lambda_0$ to about $0.31 \lambda_0$. $\lambda_0$ is a reference wavelength corresponding to a spectral region bound by or in the visible spectrum. A second layer having an optical thickness of about $0.1 \lambda_0$ to about $0.125 \lambda_0$ and a refractive index from about 2.2 to about 2.6 is deposited. A third layer having a refractive index from about 1.46 to about 1.52 is deposited.

An advantage of the optical coating of the present invention is very low reflection for a broad range of wavelengths. The optical coating of the present invention has similar performance to the quarter-half-quarter (QHQ) design over a broad band of wavelengths.

Another advantage of the optical coating of the present invention is the thin high-index second layer. High-index materials typically have a low sputtering rate. The high-index second layer of the present invention is four to five times thinner than the high-index second layer in the QHQ design and the high-index third layer in the Rock AR coating. For example, for a reference wavelength of 550 nm, the physical thickness of the second layer may be from about 20 nm to about 35 nm. The thin second layer of the present invention facilitates high throughput production of the optical coating. Thus, the optical coating may be economically produced by sputtering.

BRIEF DESCRIPTION OF THE DRAWINGS

The above and other features and aspects of the present invention will become more apparent upon reading the following detailed description in conjunction with the accompanying drawings.

In the drawings, like reference symbols are used for like or similar parts.

DETAILED DESCRIPTION OF THE INVENTION

Figure 1:
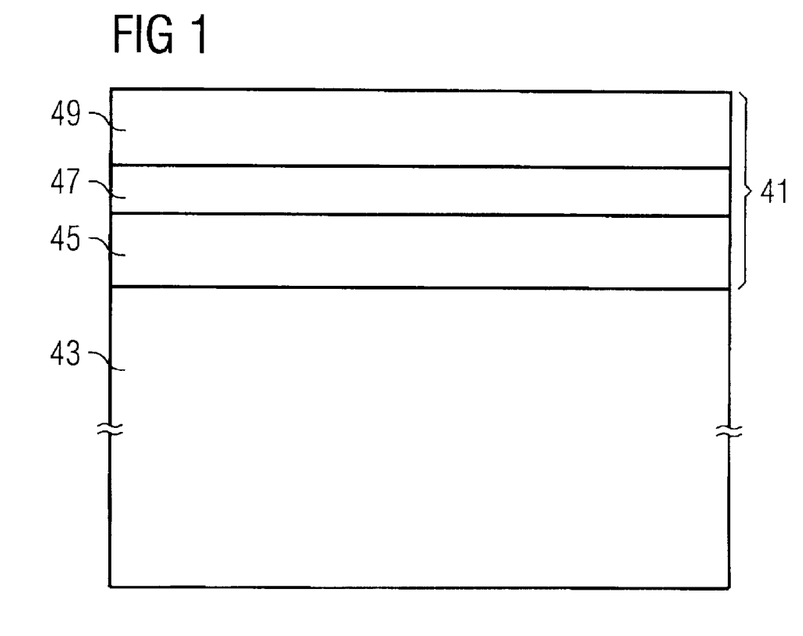
FIG. 1 is a vertical cross-sectional diagram of an anti-reflection coating on an underlying substrate, according to an embodiment of the present invention.

FIG. 1 is a cross-sectional diagram of an anti-reflection coating on an underlying substrate, according to an embodiment of the present invention. An optical coating 41 is deposited on a substrate 43, which may be transparent or may absorb light. The substrate 43 may be glass or plastic. The coating 41 includes a first layer 45, a second layer 47, and a third layer 49. The first layer 45 is deposited adjacent to the substrate 43, the second layer 47 is deposited over the first layer 45, and the third layer 49 is deposited over the second layer 47. The depositing may be by sputtering, thermal evaporation, or other methods known in the art.

The first layer 45 has an optical thickness slightly larger than $\lambda_0/4$, such as from about 0.27 $\lambda_0$ to about 0.31 $\lambda_0$. $\lambda_0$ is a reference wavelength corresponding to a spectral region bound by or in the visible spectrum. The visible spectrum is from about 380 nm to about 780 nm. $\lambda_0$ may be from about 500 nm to about 550 nm, typically about 550 nm. The first layer 45 may have a medium index of refraction, such as a refractive index from about 1.7 to about 2.1. The second layer 47 has an optical thickness of about 0.1 $\lambda_0$ to about 0.125 $\lambda_0$ and a high refractive index, such as a refractive index from about 2.2 to about 2.6. The third layer 49 has a low refractive index, such as a refractive index from about 1.46 to about 1.52, and may have an optical thickness of about 0.2 $\lambda_0$ to about 0.25 $\lambda_0$.

The physical thickness, d, of a dielectric coating is related to the optical thickness by the following equation (1):

$$d = \frac{OT}{n} \quad (1)$$

where OT is the optical thickness and n is the index of refraction. The optical thickness and the index of refraction are dependent on wavelength. The physical thickness of a layer may be selected to have the appropriate optical thickness at a reference wavelength. For example, for a wavelength of 550 nm, the physical thickness of the first layer 45, second layer 47, and third layer 49 may be from about 70 nm to about 100 nm, from about 20 nm to about 35 nm, and from about 70 nm to about 95 nm, respectively.

The high-index second layer 47 is four to five times thinner than the high-index second layer in the QHQ design and the high-index third layer in the Rock AR coating. Decreasing the optical thickness of the high-index layer in the QHQ design or the Rock AR coating would generally worsen the performance of the coating. The optical coating of the present invention achieves performance similar to the QHQ design and the Rock AR coating, while providing a thin high-index layer. The thin second layer 47 is especially advantageous because high index materials with a refractive index greater than about 2.3 sputter considerably more slowly than those materials with lower indices. This thin second layer 47 facilitates economical, high throughput production of the AR coating 41 by sputtering for applications such as architectural glass and CRT displays.

The first layer 45 may be a dielectric, such as silicon nitride, zinc oxide, indium-tin oxide (ITO), bismuth oxide, stannic oxide, zirconium oxide, hafnium oxide, antimony oxide, or gadolinium oxide. Many materials can be used for the first layer 45, including slightly more than a quarter wave of ITO, making the coating 41 appropriate for the anti-static-anti-reflection (ASAR) market. The second layer 47 may be titanium oxide, niobium oxide, or tantalum oxide. Titanium oxide has a refractive index above about 2.4. A second layer 47 comprising titanium oxide is determined to have an optical thickness of about $\lambda_0/10$ using an admittance diagram. Niobium oxide has a refractive index of about 2.28, and tantalum oxide has a refractive index of about 2.2. A second layer 47 comprising niobium oxide or tantalum oxide is determined to have an optical thickness of about $\lambda_0/8$ using an admittance diagram. The third layer 49 may be silicon dioxide or magnesium fluoride.

Figure 2:
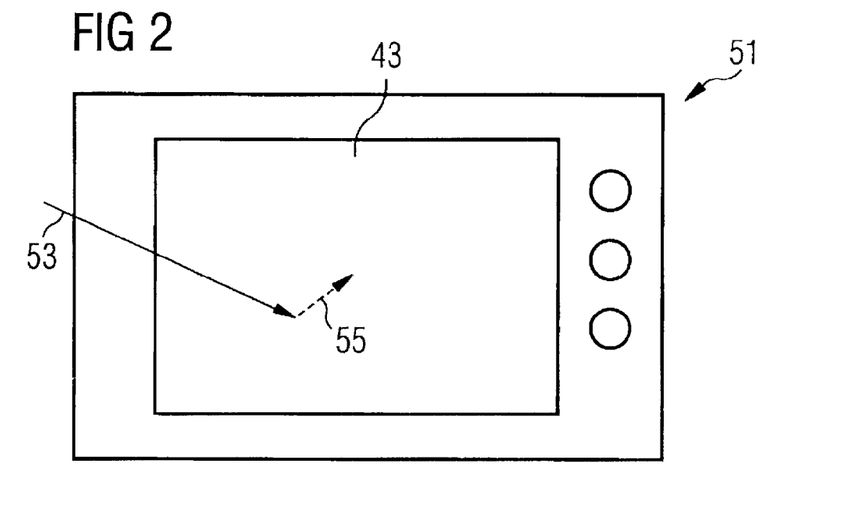
FIG. 2 is a schematic diagram showing an application of an anti-reflection coating, according to an embodiment of the present invention.

FIG. 2 is a schematic diagram showing an application of an anti-reflection coating, according to an embodiment of the present invention. The coating 41 may be applied to a substrate 43, such as a cathode ray tube, a flat panel display 51, a web, or a roll. When a ray of light 53 impinges on the surface of the substrate, a smaller fraction of the ray 53 is reflected back as a ray 55. Thus, the coating 41 reduces the reflection of light within a spectral range.

Figure 3:
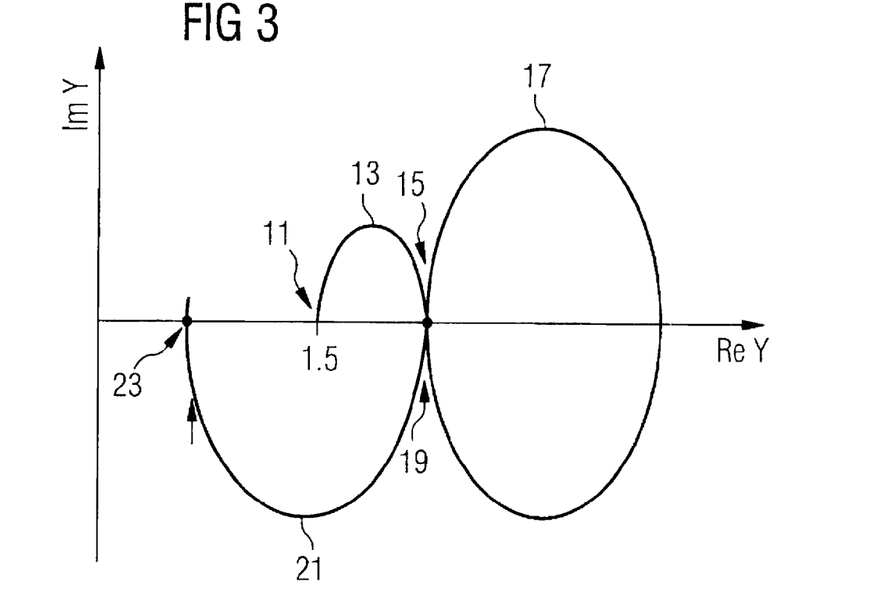
FIGS. 3 and 4 are admittance diagrams for prior art AR coatings.

An ideal anti-reflection coating has a reflectance of zero at the reference wavelength. A broadband anti-reflection coating provides a reflectance of zero for a range of wavelengths within a spectral region, such as the visible spectrum. A reflectance of zero is equivalent to an admittance of one. The admittance, Y, of a coated surface represents the effective index of refraction of the coated surface and is a function of wavelength because the indices of refraction of the layers in a coating are wavelength dependent. An admittance diagram, as shown in FIG. 3, can be used to show the functionality of layers of a coating. The horizontal and vertical axes represent the real (labeled "ReY") and imaginary (labeled "ImY") parts of the admittance. The admittance diagram applies to a single wavelength of light, which is assumed to be the reference wavelength. The diagram shows how the admittance changes as coating layers are applied to the substrate. The initial admittance starts at the index of refraction 11 of a substrate, for example, 1.5 for glass, and the ultimate admittance of the final coated surface is the value of the endpoint (i.e., point 23). As the optical thickness of a layer is increased, the admittance traces out a circle in the clockwise direction. An optical thickness of a quarter wavelength is represented by a half circle (e.g., arcs 13 and 21), while an optical thickness of a half wavelength is represented by a full circle (e.g., arc 17).

An interface between two layers may form a cusp, as represented by points 15 and 19. At a different wavelength, the admittance diagram has a different endpoint and, thus, the admittance has a different value. However, when a cusp is present, the endpoint of the admittance diagram of the coated surface stays close to the same endpoint (i.e., the same value for the admittance) at different wavelengths. Thus, a cusp is advantageous in that it anchors the endpoint of a coated surface and preserves the reflectance with wavelength. A broadband anti-reflection coating has many cusps so that the reflectance stays constant for as many wavelengths as possible. For example, a layer with an optical thickness of a half wavelength provides two cusps (e.g., points 15 and 19) and, thus, provides broadband performance.

FIG. 3 is an admittance diagram of the three-layer QHQ design. The horizontal axis represents the real part of the admittance (labeled "ReY"), and the vertical axis represents the imaginary part of the admittance (labeled "ImY"). As shown by arc 13, the medium-index first layer provides an effective refractive index of the substrate and the first layer that is higher than the refractive index of the substrate alone. The high-index second layer is an inert layer at the reference wavelength (i.e., it does not change the refractive index of the coated surface) and provides the broadband performance, as shown by arc 17. The low-index third layer 5 provides the anti-reflection property (i.e., the admittance at the endpoint is one, which is equivalent to a reflectance of zero), as shown by arc 21. The presence of the two acute cusps 15 and 19 illustrate that the admittance of the coated surface will stay near one for a broad range of wavelengths so that the reflectance is approximately zero for a broad range of wavelengths.

Figure 4:
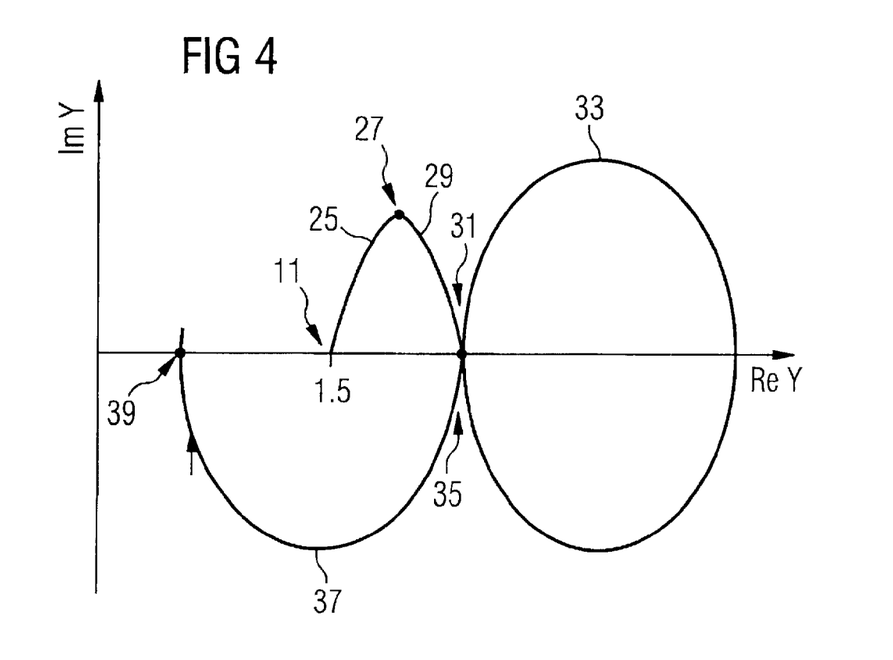

FIG. 4 is an admittance diagram of the Rock AR coating. The horizontal axis represents the real part of the admittance (labeled "ReY"), and the vertical axis represents the imaginary part of the admittance (labeled "ImY"). The first two layers provide an effective refractive index of the substrate and the first two layers that is higher than the refractive index of the substrate alone. As shown by arcs 25 and 29, respectively, the first and second layers make an effective quarter wavelength layer, and the interface between the two layers forms an obtuse cusp 27. An important feature of the Rock AR coating in terms of the admittance diagram is that the third layer gives rise to a full circle which lies completely to the right of the circle segment of the final layer, as shown by arc 33, and, thus, the halfwave-thick third layer provides the broadband performance. The fourth layer brings the admittance to one, as shown by point 39, and, thus, provides the anti-reflection property. This description is similar to that of the three-layer AR, except that the first two layers of the Rock AR coating perform the function of the medium-index first layer of the three-layer AR. The broadband performance of the high-index layer in the QHQ design and the Rock AR coating would be worsen if the optical thickness of the high-index layer were decreased.

Figure 5:
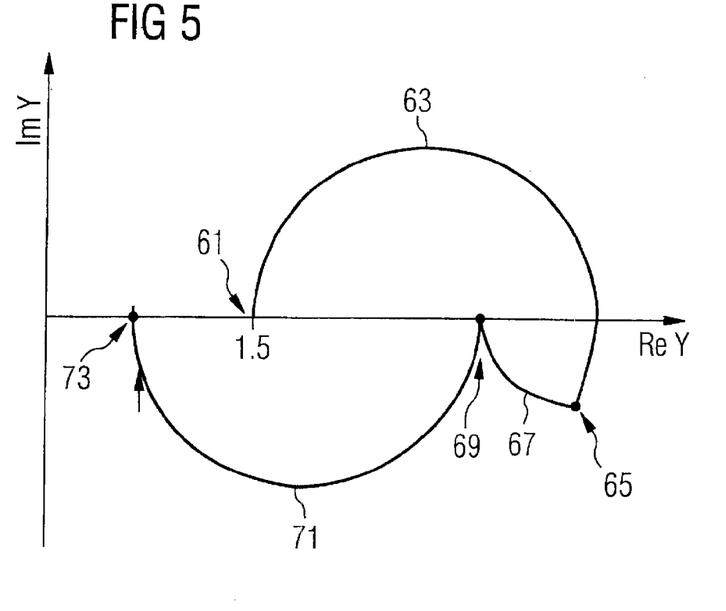
FIGS. 5 and 6 are admittance diagrams for an anti-reflection coating, according to an embodiment of the present invention.

FIG. 5 is an admittance diagram for an anti-reflection coating, according to an embodiment of the present invention. The horizontal axis represents the real part of the admittance (labeled "ReY"), and the vertical axis represents the imaginary part of the admittance (labeled "ImY"). The first layer 45 simultaneously raises the effective index of refraction of the bare substrate and buffers for the broadband effect, as shown by arc 63. The first layer 45 is slightly larger than $\lambda_0/4$ (i.e., slightly greater than a half circle) in order to provide an acute cusp 65. The second layer 47 of the present invention differs from the second layer of the QHQ design in that the second layer 47 of the present invention is never inert. The second layer 47 begins to lower the magnitude of the admittance (from the first layer 45), as shown by arc 67, and hence begins functioning as an anti-reflection layer. For the second layer 47 to perform this anti-reflection function, the first layer 45 is slightly larger than $\lambda_0/4$. The second layer 47 also functions as a steering layer so that the third layer 49 has an endpoint 73 at a value of an admittance of one. The third layer 49 more completely de-reflects, as shown by arc 71, with its endpoint 73 at a value of an admittance of one. The presence of the two cusps 65 and 69 illustrate that the optical coating of the present invention achieves similar broadband anti-reflection performance to the QHQ design and the Rock AR coating. The optical coating of the present invention advantageously has a thin high-index second layer 47 for high throughput production.

Figure 6:
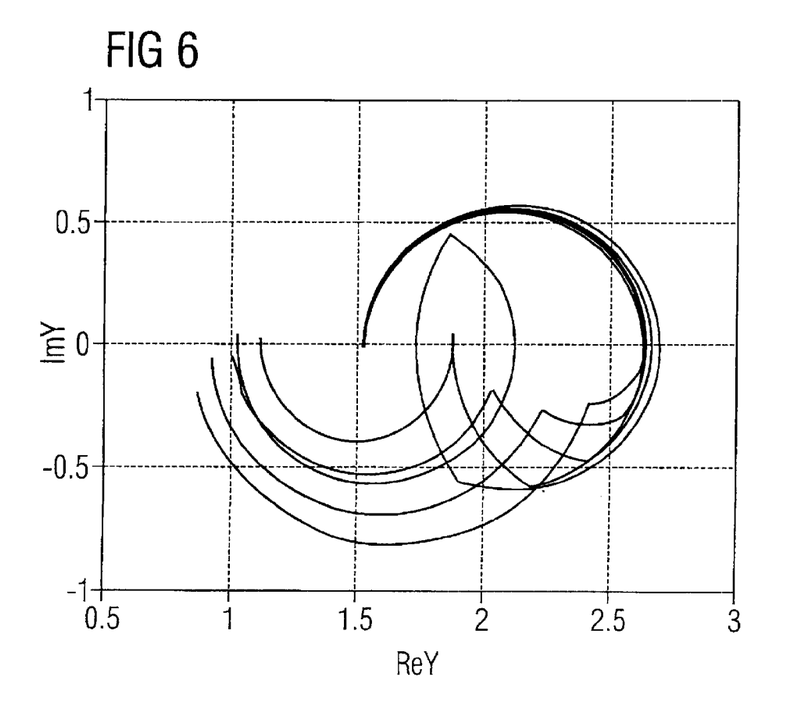

FIG. 6 is an admittance diagram for an anti-reflection coating, according to another embodiment of the present invention, which shows the variation of admittance with wavelength for an embodiment of the optical coating shown below in Table 1.

TABLE 1

| Material | Layer | Optical Thickness ($\lambda_0$) at $\lambda_0 = 550$ nm | Physical Thickness (nm) | Number of Quarter Waves at $\lambda_0 = 550$ nm |
|---|---|---|---|---|
| SiO$_2$ | Third Layer | 0.243 | 91.7 | 0.972 |
| TiO$_2$ | Second Layer | 0.095 | 21.5 | 0.38 |
| Si$_3$N$_4$ | First Layer | 0.308 | 83.9 | 1.26 |
| Glass | — | — | — | — |

The horizontal axis represents the real part of the admittance (labeled "ReY"), and the vertical axis represents the imaginary part of the admittance (labeled "ImY"). At different wavelengths (i.e., 450 nm, 500 nm, 550 nm, 600 nm, and 650 nm), the admittance of the coated surface is near one. The presence of the two cusps 65 and 69 illustrates that the endpoint stays near one and the reflectance stays near zero with changes in wavelength. Thus, broadband anti-reflection performance is achieved by the optical coating of the present invention.

Figure 7:
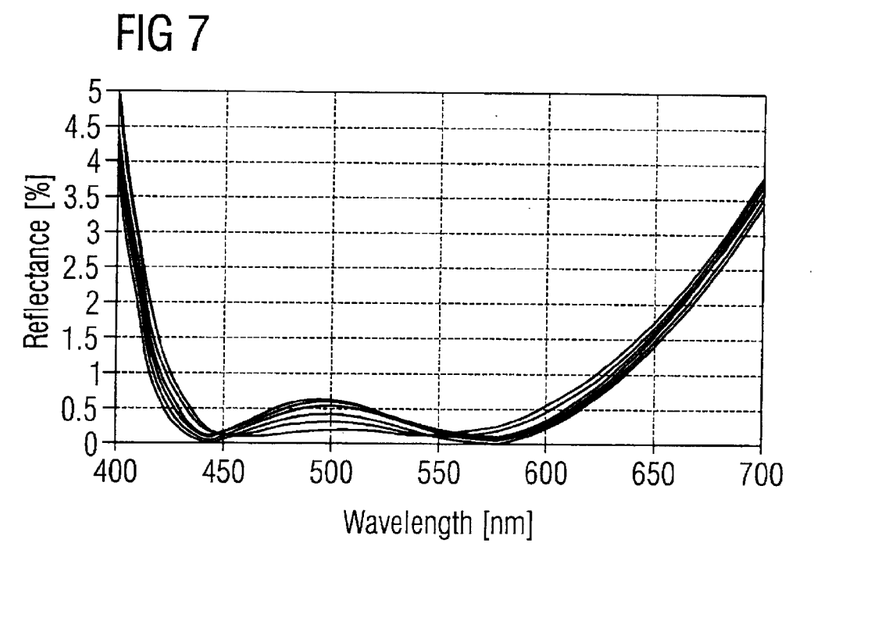
FIG. 7 is a graph showing the correlation between reflectance and wavelength for anti-reflection coatings, according to embodiments of the present invention.

FIG. 7 is a graph showing the correlation between reflectance and wavelength for anti-reflection coatings, according to embodiments of the present invention shown in Table 1. The graph shows the percent of reflectance as a function of wavelength in nanometers for anti-reflection coatings using different materials (i.e., Si$_3$N$_4$, ZnO, ITO, Bi$_2$O$_3$, SnO$_2$, ZrO$_2$, HfO$_2$, Sb$_2$O$_3$, and Gd$_2$O$_3$) for the first layer 45. The reflectance is below about 0.5% at the reference wavelength of 550 nm. Broadband performance is evidenced by the low reflectance below about 1% for wavelengths between about 425 nm and about 625 nm. Different materials are used for the first layer 45, but the physical thickness for the first layer 45 is the same for all of the embodiments in FIG. 7. This fact demonstrates the versatility of the system for material substitutions for the first layer 45.

Figure 8:
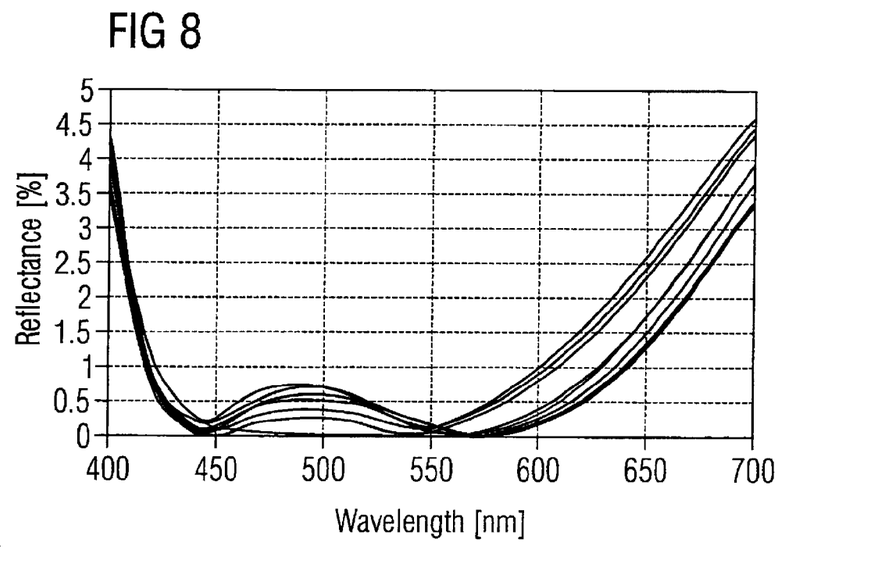
FIG. 8 is a graph showing the correlation between reflectance and wavelength for anti-reflection coatings, according to embodiments of the present invention.

FIG. 8 is a graph showing the correlation between reflectance and wavelength for anti-reflection coatings, according to embodiments of the present invention shown in Table 2 below.

TABLE 2

| Material | Layer | Optical Thickness ($\lambda_0$) at $\lambda_0 = 550$ nm | Physical Thickness (nm) | Number of Quarter Waves at $\lambda_0 = 550$ nm |
|---|---|---|---|---|
| SiO$_2$ | Third Layer | 0.23 | 87.4 | 0.92 |
| Nb$_2$O$_5$ | Second Layer | 0.13 | 33.2 | 0.52 |
| Si$_3$N$_4$ | First Layer | 0.27 | 75.3 | 1.08 |
| Glass | — | — | — | — |

This embodiment is different from that shown in Table 1 in that the material of the high-index second layer 47 has been replaced with a material with a slightly lower refractive index. To adjust for the change in refractive indices, the optical thickness has been increased. The graph shows the percent of reflectance as a function of wavelength in nanometers for anti-reflection coatings using different materials (i.e., Si$_3$N$_4$, ZnO, ITO, Bi$_2$O$_3$, SnO$_2$, ZrO$_2$, HfO$_2$, Sb$_2$O$_3$, and Gd$_2$O$_3$) for the first layer 45. The coatings have a low reflectance of below about 0.5% at the reference wavelength of 550 nm. The low reflectance below about 1% for wavelengths between about 425 nm and about 600 nm demonstrate the broadband anti-reflection performance of the coating. The physical thickness for the first layer 45 is the same for all of embodiments in FIG. 8, although different materials are used for the first layer 45. Thus, the optical coating has similar broadband anti-reflection performance with different materials for the first layer 45.

Figure 9:
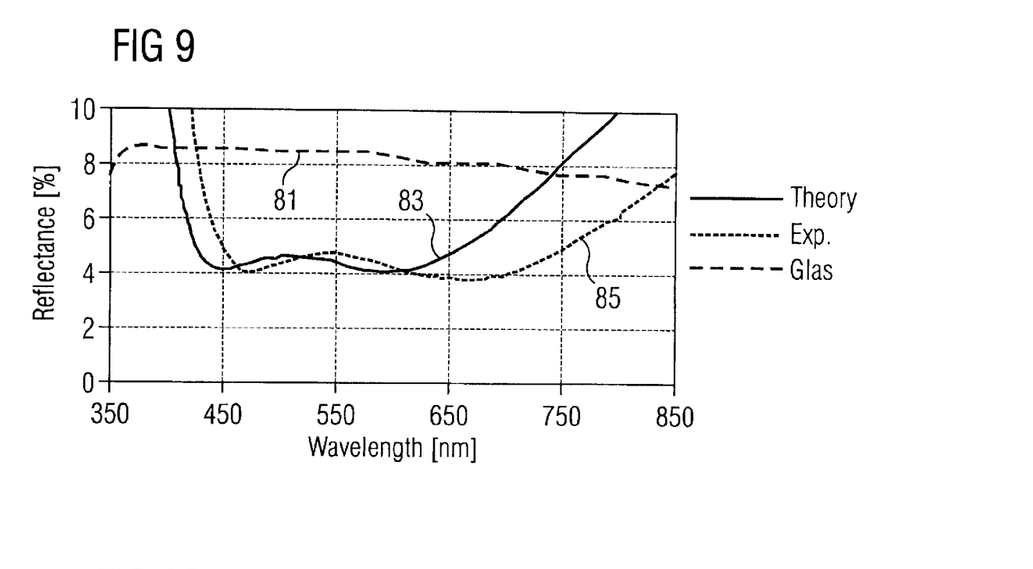
FIG. 9 is a graph showing the correlation between reflectance and wavelength for uncoated glass and an anti-reflection coating, according to an embodiment of the present invention.

FIG. 9 is a graph showing the correlation between reflectance and wavelength for uncoated glass and an anti-reflection coating, according to an embodiment of the present invention. The horizontal axis represents the wavelength of light in nanometers, and the vertical axis represents the percent reflectance. Each side of an uncoated glass reflects about four percent from about 450 nm to about 750 nm, so that the total reflectance from two sides of an uncoated glass is about eight percent, as represented by line 81. The total reflectance used here is the Y tristimulus value under D65 Illuminant with a 10 degree observer angle according to the CIE (Center for Illuminating Engineering) standard.

A single side of float glass with a total thickness of about 2.9 mm was coated with the optical coating shown in Table 1. Lines 83 and 85 represent the theoretical and experimental reflectance of the coated glass, respectively. The total reflectance from both sides of the glass was less than about 4.5% from about 450 nm to about 650 nm, as represented by lines 83 and 85, which was significantly less than the total reflectance of about eight percent from an uncoated glass. Thus, the coating reduces the reflectance from the glass for a broad range of wavelengths, such as from about 450 nm to about 650 nm. The coated glass had neutral reflected colors of $|a^*|<3$, $|b^*|<6$ under the CIE standard. These are reasonable values for the CRT display market, or architectural glass applications where anti-reflection is desired to the point where persons, for reasons of safety, should be able to detect the presence of a glass door or window (for example, shop windows).

Figure 10:
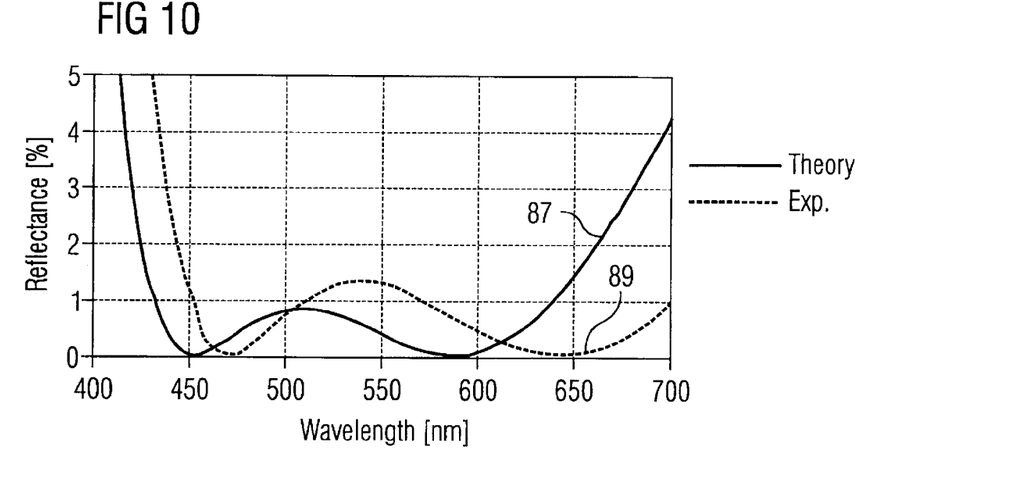
FIG. 10 is a graph showing the correlation between reflectance and wavelength for an anti-reflection coating, according to an embodiment of the present invention.

FIG. 10 is a graph showing the correlation between reflectance and wavelength for an anti-reflection coating, according to an embodiment of the present invention. The horizontal axis represents the wavelength of light in nanometers, and the vertical axis represents the percent reflectance. A bonded float glass with a total thickness of about 5.8 mm was coated on both sides with the optical coating shown in Table 1. Lines 87 and 89 represent the theoretical and experimental reflectance of the coated glass, respectively. The total theoretical reflectance from both sides of the glass was less than about 1%, as represented by line 87, while the total experimental reflectance was less than about 2%, as represented by line 89, under the CIE standard. The experimental value was less than the total reflectance of about eight percent for uncoated glass. Thus, the coating reduces reflectance from the glass for a broad range of wavelengths. The coated, bonded float lass had a measured color of $(a^*,b^*)=(14,-22)$, under the CIE standard, which is violet to he eye. The low total intensity of reflected light reduces the appearance of this color.

Figure 11:
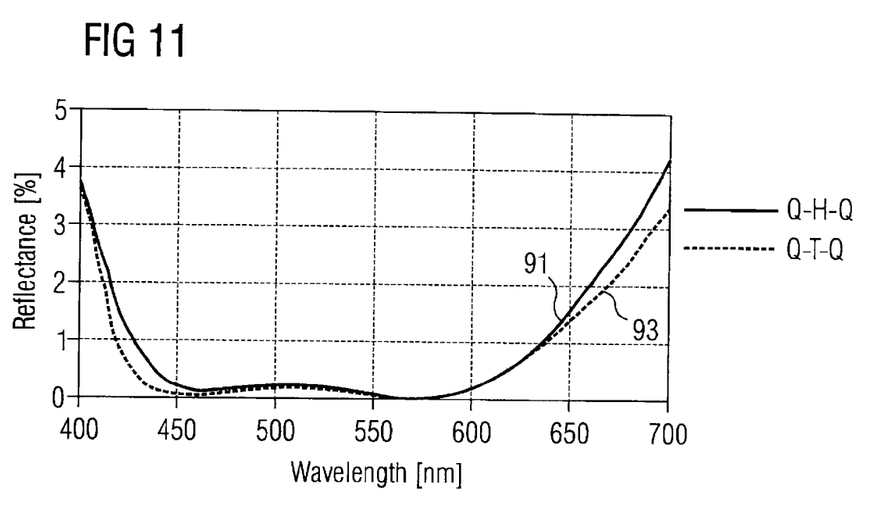
FIG. 11 is a graph showing the correlation between reflectance and wavelength for the quarter-half-quarter (QHQ) design and an anti-reflection coating, according to an embodiment of the present invention.

FIG. 11 is a graph showing the correlation between reflectance and wavelength for an anti-reflection coating, according to an embodiment of the present invention and as compared to the QHQ coating. The horizontal axis represents the wavelength of light in nanometers, and the vertical axis represents the percent reflectance. Line 91 represents a typical QHQ coating with the high index second layer of 0.8 half-waves, while line 93 represents the optical coating shown in Table 1. The QHQ coating, as represented by line 91, has slightly lower reflectance at wavelengths between about 460 nm to about 600 nm than the optical coating of the present invention, as represented by line 93, has. Although the anti-reflection coating of the present invention has a slightly lower performance than the QHQ design has, the anti-reflection coating advantageously exploits the thin second layer 47 for throughput.

It is to be understood that while the invention has been described above in conjunction with specific embodiments, the description and examples are intended to illustrate and not limit the scope of the invention.

What is claimed is:

1. An optical coating, comprising:
    a first layer adjacent to a substrate, said first layer having an optical thickness of about $0.27 \lambda_0$ to about $0.31 \lambda_0$;
    a second layer having an optical thickness of about $0.1 \lambda_0$ to about $0.125 \lambda_0$ and a refractive index from about 2.2 to about 2.6; and
    a third layer having a refractive index from about 1.46 to about 1.52;
    where $\lambda_0$ is a reference wavelength corresponding to a spectral region bound by or in the visible spectrum.

2. The coating according to claim 1, wherein said first layer has a refractive index from about 1.7 to about 2.1.

3. The coating according to claim 1, wherein the first layer comprises a dielectric.

4. The coating according to claim 1, wherein said first layer comprises a material selected from a group consisting of silicon nitride, zinc oxide, indium-tin oxide, bismuth oxide, stannic oxide, zirconium oxide, hafnium oxide, antimony oxide, and gadolinium oxide.

5. The coating according to claim 1, wherein said first layer has a physical thickness from about 70 nm to about 100 nm.

6. The coating according to claim 1, wherein said second layer comprises a material selected from a group consisting of titanium oxide, niobium oxide, and tantalum oxide.

7. The coating according to claim 1, wherein said second layer has a physical thickness from about 20 nm to about 35 nm.

8. The coating according to claim 1, wherein said third layer has an optical thickness of about $0.2 \lambda_0$ to about $0.25 \lambda_0$.

9. The coating according to claim 1, wherein said third layer comprises a material selected from the group consisting of silicon dioxide and magnesium fluoride.

10. The coating according to claim 1, wherein said third layer has a physical thickness from about 70 nm to about 95 nm.

11. The coating according to claim 1, wherein said coating is applied to a substrate.

12. The coating according to claim 1, the coating having less than five layers.

13. A method of coating a substrate, comprising:
    depositing a first layer adjacent to the substrate, said first layer having an optical thickness of about $0.27 \lambda_0$ to about $0.31 \lambda_0$;
    depositing a second layer having an optical thickness of about $0.1 \lambda_0$ to about $0.125 \lambda_0$ and a refractive index from about 2.2 to about 2.6; and
    depositing a third layer having a refractive index from about 1.46 to about 1.52;
    where $\lambda_0$ is a reference wavelength corresponding to a spectral region bound by or in the visible spectrum.

14. The method of claim 13, wherein said depositing of layers comprises sputtering.

15. The method of claim 13, wherein said first layer has a refractive index from bout 1.7 to about 2.1.

16. The method of claim 13, wherein said first layer comprises a dielectric.

17. The method of claim 13, wherein said first layer comprises a material selected from a group consisting of silicon nitride, zinc oxide, indium-tin oxide, bismuth oxide, stannic oxide, zirconium oxide, hafnium oxide, antimony oxide, and gadolinium oxide.

18. The method of claim 13, wherein said first layer has a physical thickness from about 70 nm to about 100 nm.

19. The method of claim 13, wherein said second layer comprises a material selected from a group consisting of titanium oxide, niobium oxide, and tantalum oxide.

20. The method of claim 13, wherein said second layer has a physical thickness from about 20 nm to about 35 nm.

21. The method of claim 13, wherein said third layer has an optical thickness of about 0.2 $\lambda_0$ to about 0.25 $\lambda_0$.

22. The method of claim 13, wherein said third layer comprises a material selected from a group consisting of silicon dioxide and magnesium fluoride.

23. The method of claim 13, wherein said third layer has a physical thickness from about 70 nm to about 95 nm.

24. The method of claim 13, wherein said substrate comprises glass, a cathode ray tube, a flat panel display, a web, or a roll.

25. An optical coating, comprising:

a first layer adjacent to a substrate, said first layer having an optical thickness of about 0.27 $\lambda_0$ to about 0.31 $\lambda_0$;

a second layer having an optical thickness of about 0.1 $\lambda_0$ to about 0.125 $\lambda_0$; and a third layer having an optical thickness of about 0.2 $\lambda_0$ to about 0.25 $\lambda_0$;

where $\lambda_0$ is a reference wavelength corresponding to a spectral region bound by or in the visible spectrum, and where a refractive index of said first layer is lower than a refractive index of said second layer and higher than a refractive index of said third layer.

26. A method of coating a substrate, comprising:

depositing a first layer adjacent to the substrate, said first layer having an optical thickness of about 0.27 $\lambda_0$ to about 0.31 $\lambda_0$;

depositing a second layer having an optical thickness of about 0.1 $\lambda_0$ to about 0.125 $\lambda_0$; and depositing a third layer having an optical thickness of about 0.2 $\lambda_0$ to about 0.25 $\lambda_0$;

where $\lambda_0$ is a reference wavelength corresponding to a spectral region bound by or in the visible spectrum, and where a refractive index of said first layer is lower than a refractive index of said second layer and higher than a refractive index of said third layer.

* * * * *